US008480332B2

(12) United States Patent  (10) Patent No.: US 8,480,332 B2
Miller  (45) Date of Patent: Jul. 9, 2013

(54) LAYING AND PROTECTING CABLE INTO EXISTING COVERING SURFACES

(75) Inventor: Daniel Paul Miller, Brush Prairie, WA (US)

(73) Assignee: Certusview Technologies, LLC, Palm Beach Gardens, FL (US)

( * ) Notice: Subject to any disclaimer, the term of this patent is extended or adjusted under 35 U.S.C. 154(b) by 146 days.

(21) Appl. No.: 12/889,196

(22) Filed: Sep. 23, 2010

(65) Prior Publication Data

US 2011/0070030 A1 Mar. 24, 2011

Related U.S. Application Data

(60) Provisional application No. 61/244,954, filed on Sep. 23, 2009.

(51) Int. Cl.
 *F16L 1/00* (2006.01)
(52) U.S. Cl.
 USPC ............... 405/154.1; 405/155; 405/179
(58) Field of Classification Search
 USPC ............ 405/154.1, 155, 179, 180; 37/352, 37/355, 142.5; 404/90, 91, 94
 See application file for complete search history.

(56) References Cited

U.S. PATENT DOCUMENTS

| 2,754,101 | A | * | 7/1956 | Haworth et al. | 299/18 |
|---|---|---|---|---|---|
| 4,329,083 | A | * | 5/1982 | Parkinson | 405/184.5 |
| 5,879,109 | A | * | 3/1999 | Finzel et al. | 405/174 |
| 6,099,080 | A | * | 8/2000 | Hirashita et al. | 299/39.3 |
| 6,371,691 | B1 | * | 4/2002 | Finzel et al. | 405/157 |
| 6,503,025 | B1 | * | 1/2003 | Miller | 405/231 |
| 6,807,355 | B2 | | 10/2004 | Dofher | |
| 7,050,683 | B2 | | 5/2006 | Dofher | |
| 7,095,930 | B2 | * | 8/2006 | Storaasli et al. | 385/100 |
| D640,290 | S | | 6/2011 | Stellman et al. | |
| 8,061,344 | B2 | | 11/2011 | Dofher | |
| 2002/0061231 | A1 | | 5/2002 | Finzel | |
| 2005/0191113 | A1 | | 9/2005 | Frazier | |
| 2010/0071596 | A1 | * | 3/2010 | Konczak | 106/707 |
| 2011/0016754 | A1 | | 1/2011 | Ruhl et al. | |
| 2012/0048148 | A1 | | 3/2012 | Konczak | |
| 2012/0195694 | A1 | | 8/2012 | Konczak | |
| 2013/0044918 | A1 | | 2/2013 | Nielsen et al. | |

FOREIGN PATENT DOCUMENTS

| JP | 08-081913 | 3/1996 |
|---|---|---|
| JP | 10-280315 | 10/1998 |

(Continued)

OTHER PUBLICATIONS

Lee Yong Ho, International Search Report, Jun. 20, 2011, 4 pages, Korean Intellectual Property Office, Republic of Korea.

(Continued)

*Primary Examiner* — Sean Andrish
(74) *Attorney, Agent, or Firm* — Foley & Lardner LLP; Joseph Teja, Jr.

(57) ABSTRACT

To construct an underground cable line in-situ, cut and immediately evacuate a void in the existing covering surface. Next, lay or apply cable(s) into the void. Then, flow a non-shrinking composition into a portion of the void around the cable to fill a portion of the void. Upon rigidification the cable is encased in the void by the non-shrinking composition. Last, apply a topping material to the exposed surface of the composition in such volume as to fill any remaining portion of the void.

40 Claims, 6 Drawing Sheets

FOREIGN PATENT DOCUMENTS

| | | |
|---|---|---|
| JP | 2001-107314 | 4/2001 |
| KR | 20-0364313 | 10/2004 |
| KR | 10-2004-0096985 | 11/2004 |
| KR | 10-2006-0040419 | 5/2006 |
| KR | 10-0714162 | 5/2007 |
| KR | 20-2008-0005301 | 11/2008 |
| WO | WO2006048686 | 5/2006 |

OTHER PUBLICATIONS

Lee Yong Ho, Written Opinion of the International Searching Authority, Jun. 20, 2011, 4 pages, Korean Intellectual Property Office, Republic of Korea.

U.S. Appl. No. 13/796,391, filed Mar. 12, 2013, Nielsen et al.

* cited by examiner

LAYING AND PROTECTING CABLE INTO EXISTING COVERING SURFACES

CROSS-REFERENCE TO RELATED APPLICATIONS

This application claims the benefit of U.S. Provisional Application No. 61/244,954 filed Sep. 23, 2009.

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A "SEQUENCE LISTING", A TABLE, OR A COMPUTER PROGRAM

Not Applicable.

BACKGROUND

Problems are encountered when attempting to lay the "last mile" of underground cables such as, for example, a fiber optic cable or an electrical cable. The problem is accentuated in urban areas due to the dense build-out of the surrounding area, traffic congestions, and on-going road repairs occurring in urban areas.

Such cables may or may not be enclosed in a pipe or a conduit depending on customer needs. One or more cables may be enclosed in such a pipe or conduit depending on customer needs.

Prior systems used for the construction of underground paths for the insertion of underground cable were cumbersome. For example, operators had to make multiple passes to cut a slot prior to adequate insertion of the cable.

SUMMARY

An efficient system and method for laying the "last mile" of underground cables creating minimal disruption to property owners or less impact to the neighborhood is needed.

The following steps are carried out in the system and method. First, cut and immediately evacuate a void in the existing covering surface. Next, lay or apply cable(s) (cable, ducts and/or conduits) into the void (i.e. underground). Then, flow a non-shrinking composition into a portion of the void around the cable to fill a portion of the void. Upon rigidification the cable is encased in the void by the non-shrinking composition. Last, apply a topping material to the exposed surface of the composition in such volume as to fill any remaining portion of the void. This seals the void now filled with an underground cable line as encased by the composition.

DETAILED DESCRIPTION OF THE PREFERRED EMBODIMENT(S)

Figure 1:
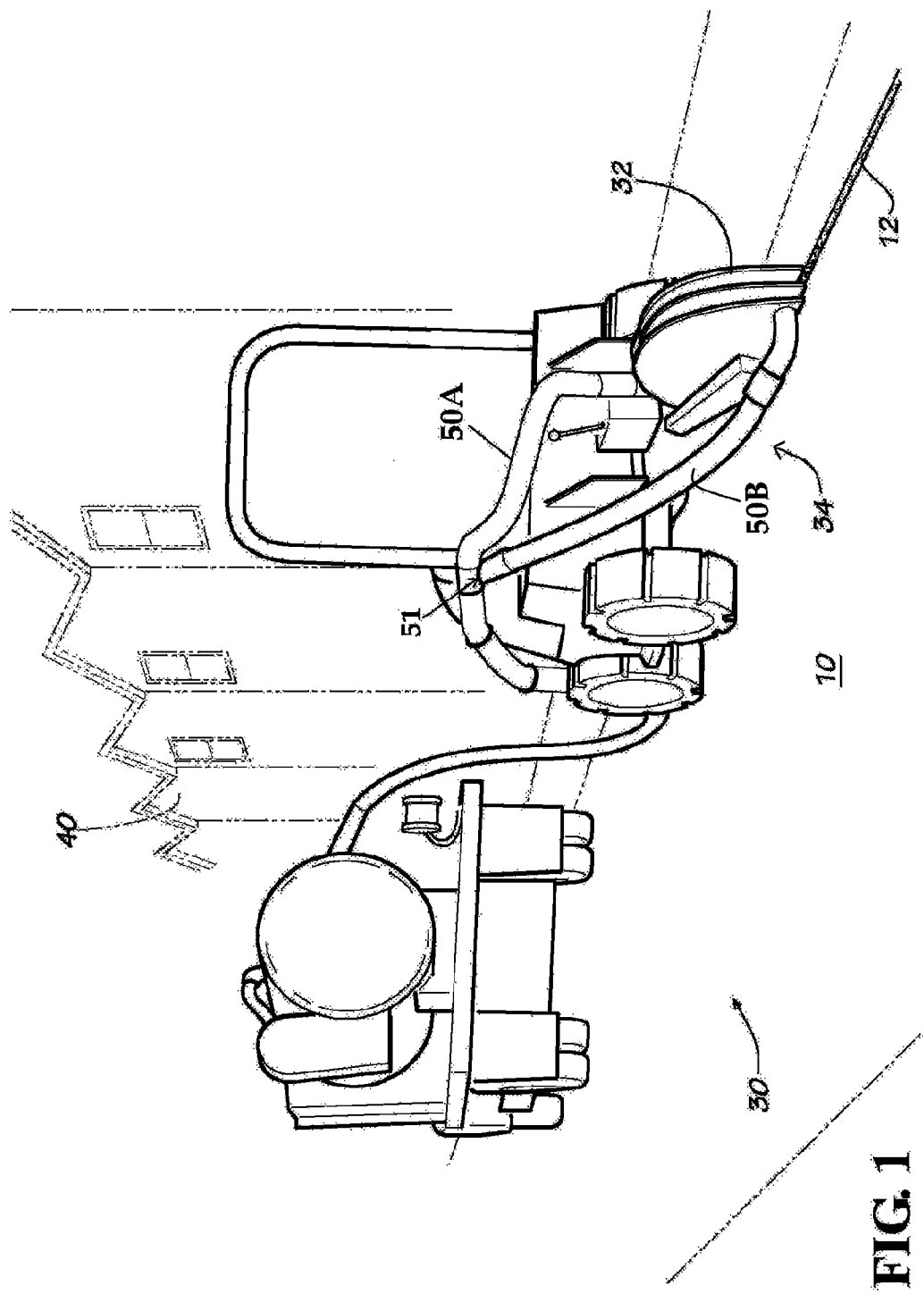
FIG. 1 is an elevation view of a cutting and evacuating machine making a channel through the covering surface in a neighborhood.
Figure 2:
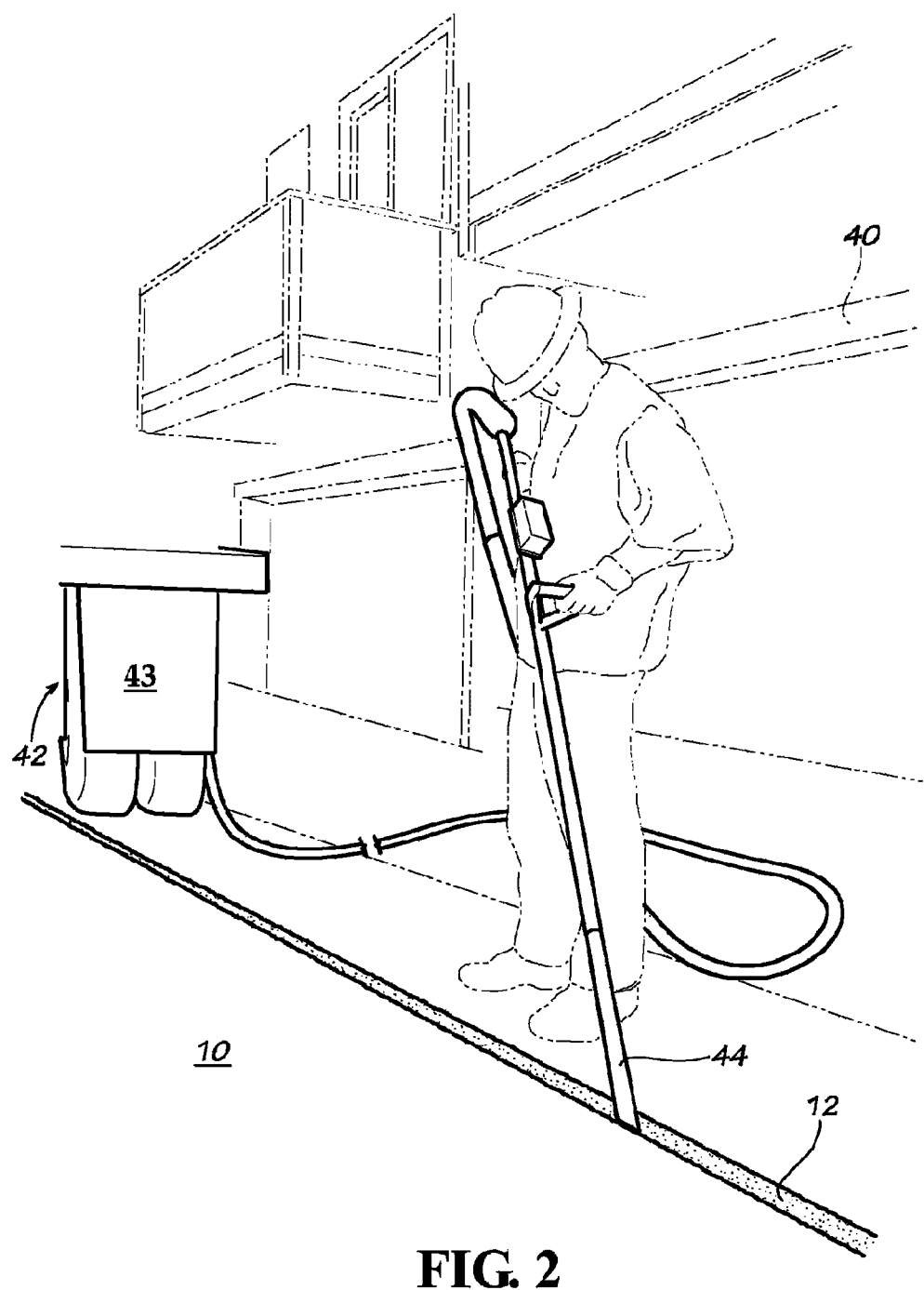
FIG. 2 is an elevation view of a grouting machine flowing grout into the channel of the covering surface within a neighborhood.
Figure 3:
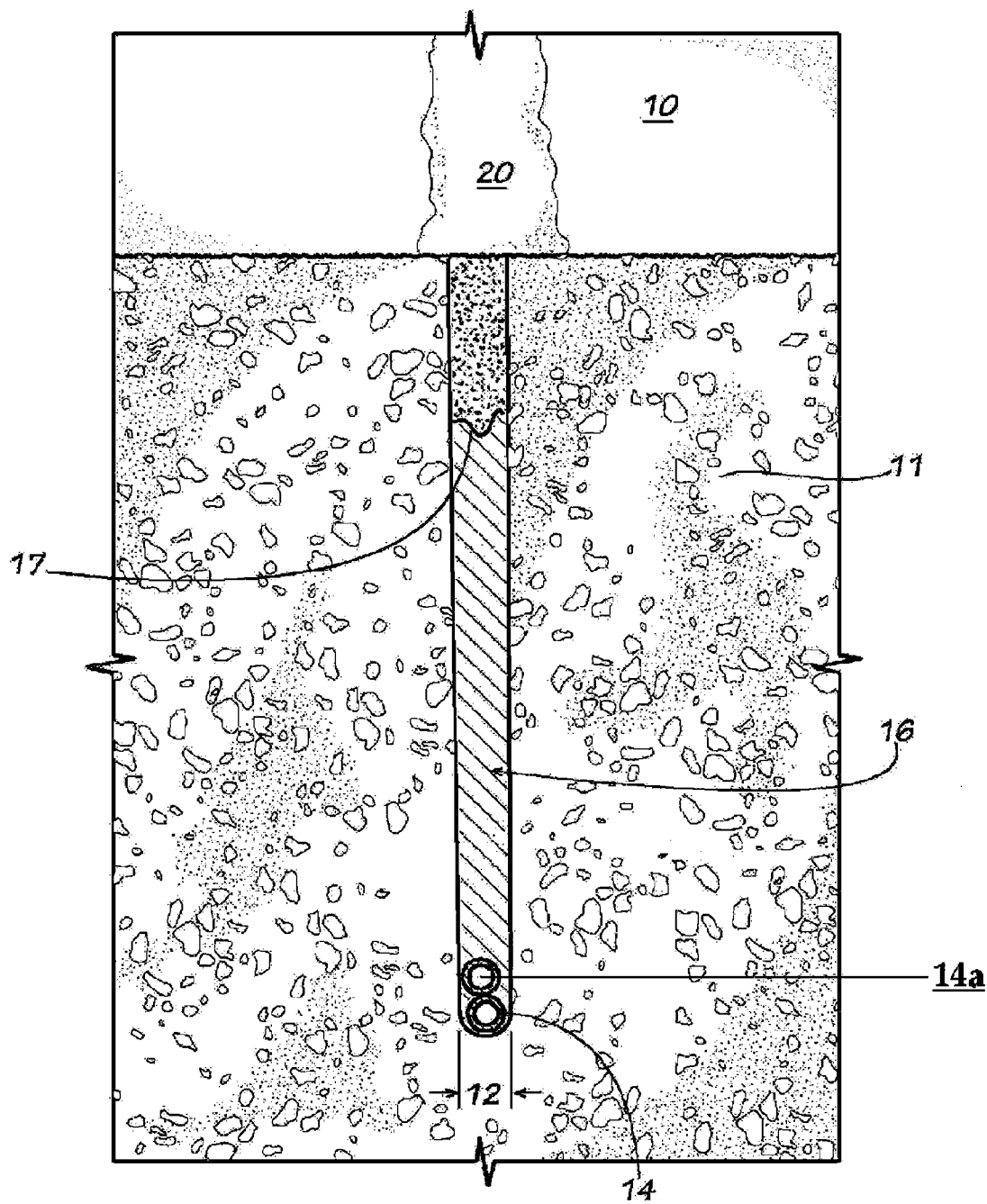
FIG. 3 is a sectional view of a channel through a covering surface filled with cables, grout and topping material.

Referring to FIG. 1, an underground cable line 14 (FIG. 3) may be constructed or installed into an existing covering surface 10. The covering surface 10 is normally pre-existing and hence the challenge for construction of the underground cable line 14. Such existing covering surface 10 could be, but is not limited to, pavement, paving, concrete, asphalt, blacktop, cobblestone, brick, other road base, grade or surface, or the like, or any combination of the foregoing (e.g. combination of asphalt laid over concrete).

Figure 4:
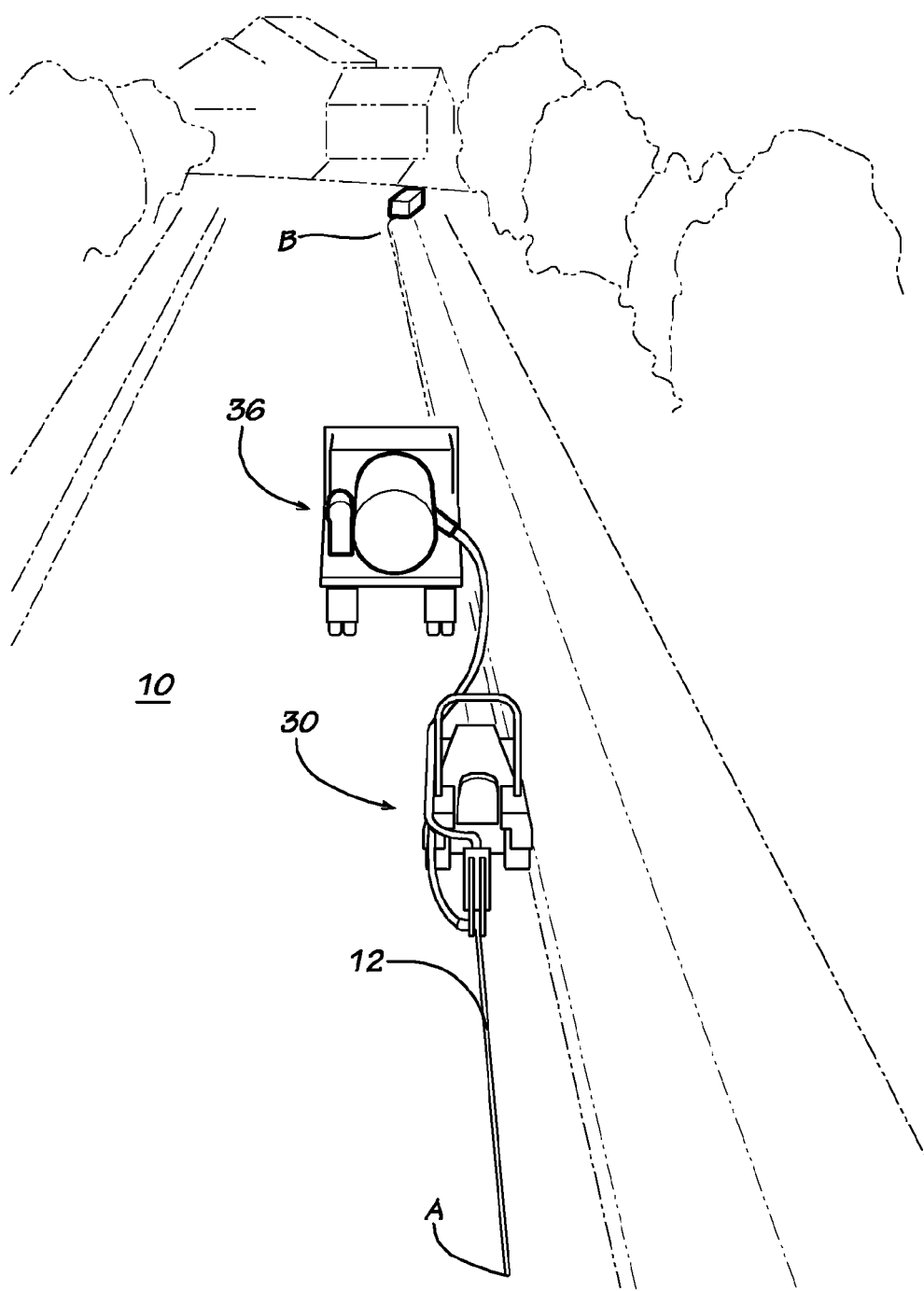
FIG. 4 is a perspective view of one embodiment cutting and evacuating a void in an existing covering surface within a neighborhood.

To construct the underground cable line 14, operator(s) cut and evacuate a void, channel or passage 12 into the existing covering surface 10 (having sub-surface 11). It is advantageous to avoid making multiple passes (as done in prior systems) in order to cut the void 12. Therefore the void 12 is cut in one and only one pass or swath from, referring to FIG. 4, a first position or starting point A to a second position or finishing point B (which may, for example, be separated by some kilometers or in another example by 45.72 meters (150 feet), i.e., cut in one and only one pass by a distance more than a few centimeters). Some of the advantages to using this technique include that the base is not disturbed as with multiple passes; less time is consumed in construction the void; the void is constructed with a simple uniform cut. Therefore the technique of cutting the void 12 in one and only one pass is quite advantageous.

Figure 5:
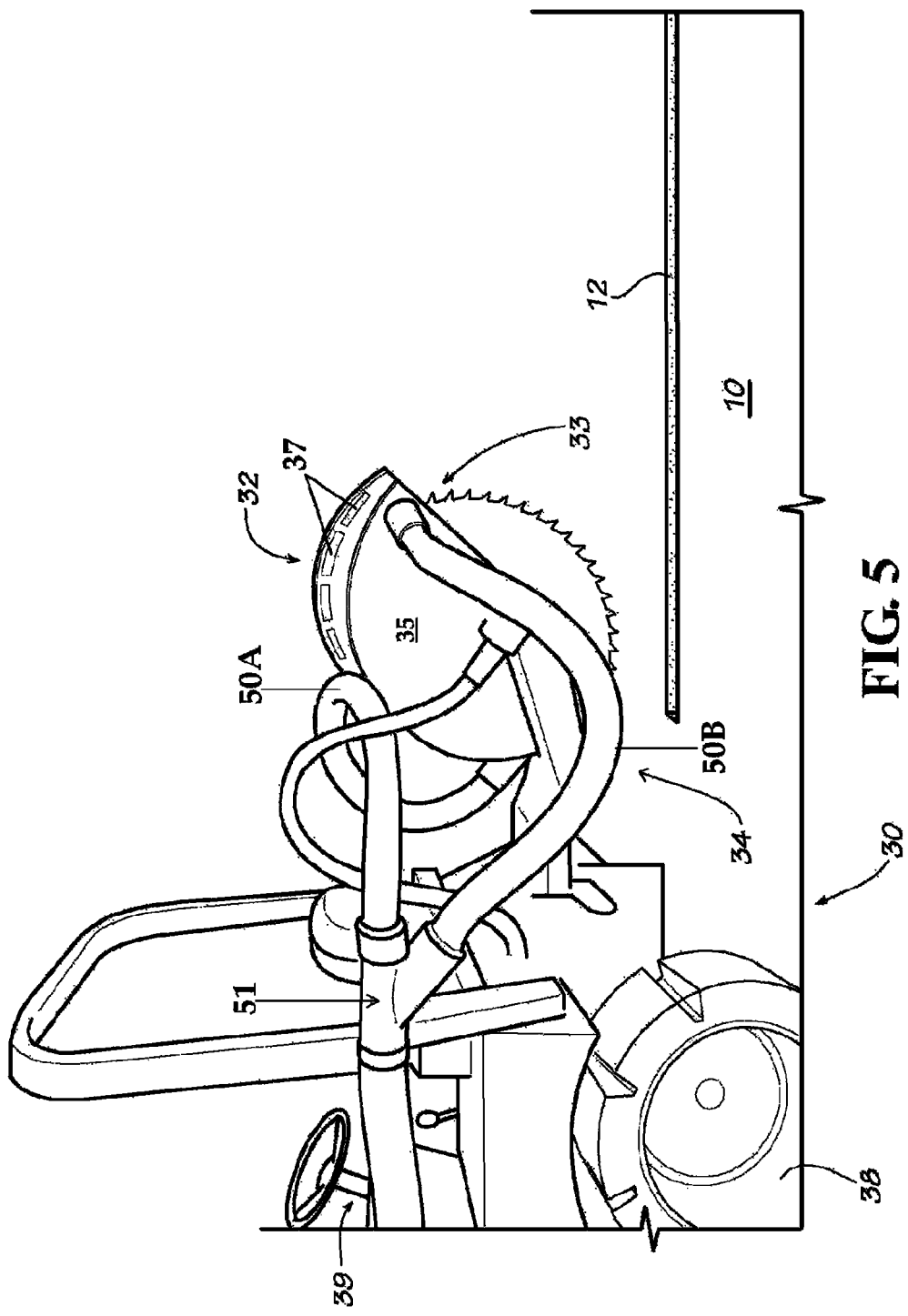
FIG. 5 is an elevation view of an embodiment of a portable cutting and evacuating machine with the blade of the cutter raised for inspection or transport.

One embodiment of a machine 30 which may be used to cut and evacuate in one and only one swath includes, for example, a cutter 32 with a narrow rotating blade 33 (FIG. 5) that will cut the existing covering surface 10 leaving a void 12 behind. The machine 30 is portable via, for example, wheels 38 (FIG. 5), and has an operator control station 39.

Accompanying the cutter 32, the machine 30 also immediately cleans or evacuates the void 12 such as by blowing, vacuuming, and/or sweeping the void 12. In the embodiment shown, a vacuum system 34 (e.g., including two evacuation ducts 50A and 50B and a Y-duct 51) accompanies the cutter 32. Preferably, but not limited to, the vacuum system 34 is in juxtaposition with respect to the cutter 32 and is mounted upper-lower, respectively and in relation to the cutter 32 such that the step of vacuuming occurs concurrent with the step of cutting the void 12. The vacuum system 34 may be connected to an independent portable vacuuming system 36 (FIG. 4) via a Y-duct 51.

Figure 6:
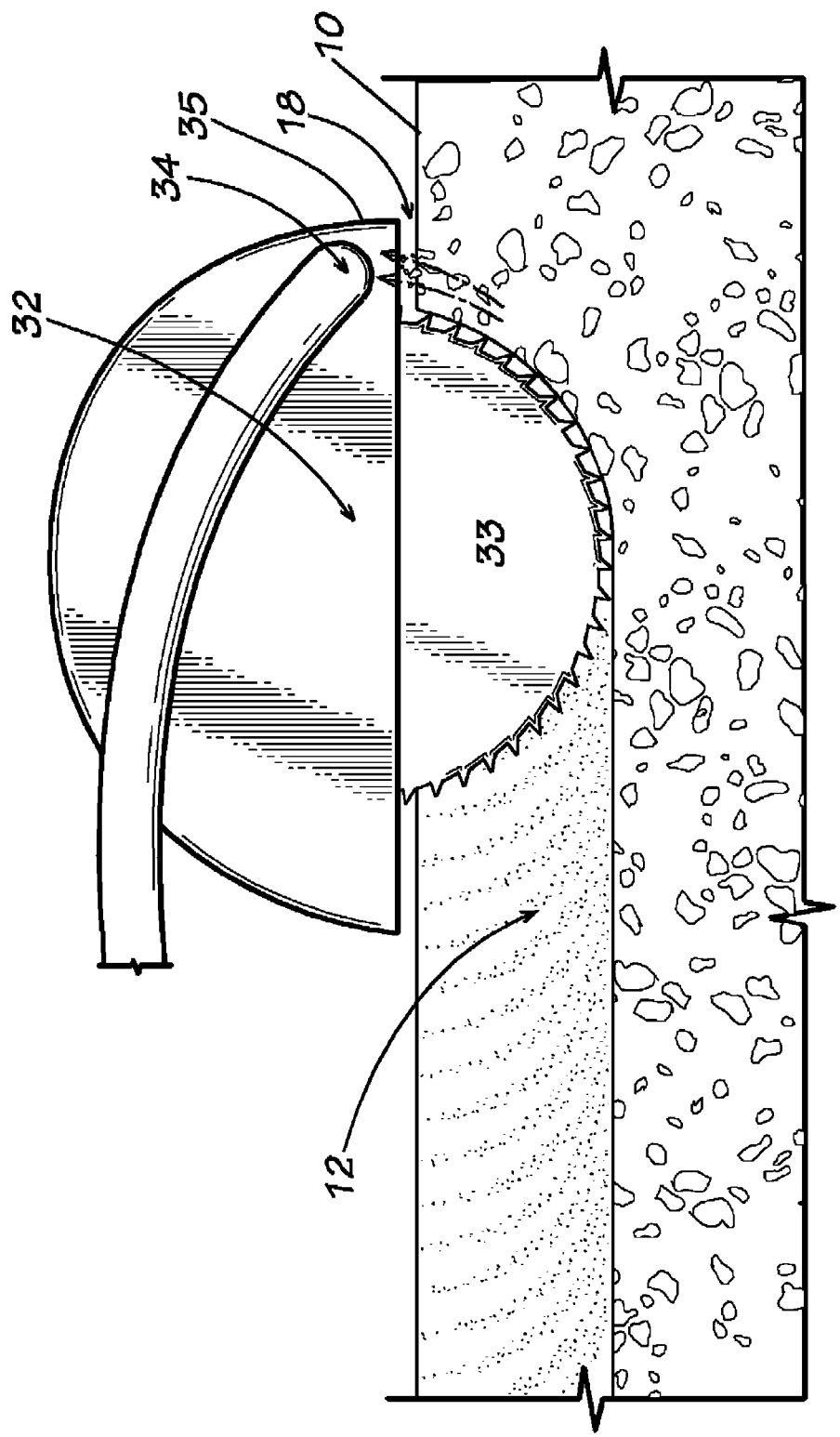
FIG. 6 is a schematic view in section of an embodiment of a cutter and vacuum system cutting and evacuating a void which is being cut into an existing covering surface.

In cutting the void 12 the action of the cutter 32 cuts and moves material and/or soil from the covering surface 10. this creates a stream or volume of debris (designated by arrows 18, FIG. 6) that generally has momentum from and travels in the direction of the cutter 32 (at least initially). The vacuum system 34 in juxtaposition to the cutter 32 concurrently, immediately and directly suctions the stream of debris 18 (preferably all or at least substantially all of the debris 18) through an inlet shroud 35 that includes one or more vents 37 and which overlaps the path of the stream of debris 18. This prevents the stream of debris 18 (containing cuttings, remnants, and/or excavated matter from the covering surface 10) from diffusing, circling with, and or recycling with the cutter 32 back into the void 12 and from creating dust in general. In the embodiment shown, the cutter 32 actually assists in moving the stream of debris around and into the cubic feet per second airflow suction of the vacuum system 34.

The blade 33 of the cutter 32 must have a width and diameter sufficient to cut a void 12 having a width and depth as follows. The width of the void 12 should be narrow, i.e., as narrow as possible to fit cable(s) or duct(s) 14 within the void 12. This allows vehicles to traverse the void 12 while the underground cable line 14 is being constructed at the installation site. One example of an acceptable width is 1.75 cm (¹¹⁄₁₆ths of an inch). For purposes of limiting the changing of the cutter 32 blade 33 it may be useful to offer standard width voids/channels 12, and normally the width of the void 12 will be selected from either a range of 1.9 cm to 2.54 cm (0.75 in.-1 in. wide), or a 3.175 cm (1.25 in.) wide void. However, the width of the void 12 is not limited to these certain standard ranges. The width of the void 12 should be less than about 3.8 cm (1.5 inches) in any case and preferably less than or equal to 3.175 cm (1.25 in.). It has been discovered that if the width of the void 12 is too large, the asphalt will not properly bridge making the disclosed technique ineffective. On the lower end, voids 12 having a width of 1.27 cm (0.5 in.) have been successfully implemented, but 1.27 cm (0.5 in.) is not necessarily limiting at the lower end.

The void 12 must be greater than 10.16 cm (four inches) deep into the covering surface 10. Presently the preferred depth of the void 12 is 30.48 cm (twelve inches) deep. This avoids the penetration of existing utility lines (and further thereby speeds the permitting process). Excessive depth of the channel may inhibit evacuation of the cuttings or penetrate to undesirable areas but otherwise the depth of void 12 is not limited.

As described above the evacuating step pertains to the removal from the void 12 of any cuttings, etc. in the stream of debris 18 resulting from the cutting of the existing surface 10. Vacuuming simultaneously or instantaneously with the cutting of the void 12 is critical or quite advantageous to the effectiveness of the technology. By suctioning while cutting less dust is created, the action of the moving volume of air cools the cutting blade 33, removes materials that could create greater friction on the spinning blade 33, and creates a void 12 free of loose debris/cuttings. Vacuuming is one example of a procedure to be used for evacuating.

One embodiment of a machine 30 which is acceptable for use for carrying out the steps of cutting and evacuating is commercially available from DITCHWITCH of Perry, Okla., USA.

The cable(s) (cable, ducts and/or conduits) 14 must be laid or applied into the void 12. This may be performed by hand or machine (e.g. by machine 30). The cable(s) 14 are preferably placed into the bottom of the void 12. More than one cable 14 may be placed in the void 12. By way of example, ten to twelve small cables 14 each of which run to individual residences 40 may be placed in the void 12 together with another main cable 14a. Each cable 14 may contain, for example, one-hundred and forty-four fibers.

A composition 16 is flowed into the void 12 and over the cable(s) 14. Generally, the composition must be a flowable composition 16 and non-shrinking upon drying. The composition 16 fills a bottom portion of the void 12 and bonds or encases the cable(s) 14. The composition 16 is preferably a plaster, grout, or mortar substance.

For flowing and encasing it is currently preferable to flow a composition 16 in the form of a grout into the void 12 and over the cable(s) 14. To apply, the operator will ensure the duct 44 is held down into the void 12. Next, the grout is pumped of poured into the void 12 using, for example, a traditional grouting machine 42 having a pump 43 so that it will flow through the duct 44 and into the void 12. Preferably the operator will not fill the void 12 with the composition 16 up to the top level of the "covering surface" 10.

In describing the composition 16, by referring to it a "flowing" or "flowable", this means the composition 16 is viscid (i.e. has a sticky and fluid consistency) yet having a viscosity that does not prevent it from flowing into the void 12 on top of, around and under (i.e. surrounding) the cable(s) 14. The composition 16 flows under the cable(s) 14 and the cable(s) 14 could even experience some rise as the composition 16 flows around that cable(s) 14 depending upon specific gravity of the cable(s) 14 relative to the composition 16. Due to the flowability, no air-bubbles or spaces are created in the filled portion of the void 12 below the top surface 17 of the composition 16.

In describing the composition 16, by referring to it as "non-shrinking", this means the composition 16 is non-compressible, non-expandable, with no contraction. By way of example, the composition 16 should shrink less than one percent upon drying at ambient temperatures. As the composition 16 dries, no air-bubbles or spaces are created in the filled portion of the void 12 below the top surface 17 of the composition 16. There is no requirement to tamp the composition 16.

The composition 16 undergoes rigidification or solidification upon drying or setting. Upon drying, the cable(s) 14 are encased within the composition 16 within the void 12.

The composition 16 should be fast drying. The composition 16 should begin to rigidify within the first hour allowing the topping material 20 to be applied within approximately three to twelve hours after the composition 16 has been pumped or poured into the void 12.

The dried, rigidified composition 16 is impermeable meaning its hydraulic permeability is less than 0.0000001 cm/s. It has been discovered that groundwater does not negatively affect the integrity of the composition once it is rigidified within the void 12.

The currently preferred composition 16 is a grout 16a sold under the name SUPERGROUT, but other sufficiently flowable, non-shrinking materials may be implemented into the respective embodiment(s) of the technology discussed herein. SUPERGROUT is commercially available via the owner of domain name "supergroutproducts.com" or from MTsupergrout.com of Saginaw, Mich. In preparation, the grout 16a should be fluid when mixed with water. Blend, for example, nineteen liters (five gallons) of potable water per seventy pound bag of SUPERGROUT. The grout 16a sets in four hours, and sets as a rigid body. Such grout 16a may be topped off with a topping material 20 within one hour of pumping or pouring.

The composition 16 and the remaining top portion of the void 12 should be filled with a topping material 20 (e.g. blacktop) to cover and seal the composition 16 and the void 12. The topping material 20 preferably adheres to the composition 16. Preferably the topping material 20 is aesthetically invisible to the untrained eye.

It may be preferable to add or blend aggregate into the topping material 20 prior to its application. One having ordinary skill in the art knows how to apply such a topping material 20 which may, for example, be blacktop, asphalt or bitumen heated to 177° centigrade (350° Fahrenheit), and then applied or flowed into the remainder portion of the void 12.

A currently preferred topping material 20 (blacktop or asphalt) is a mastic repair material commercially available from (with specifications as provided by) Deery American Corporation, such as that, for example, sold under the brand name DEERY LEVEL & GO repair mastic or the like. Then, aggregate may be mixed in prior to application.

An operator having ordinary skill in the art may desire to cut a bend or curve when cutting a void 12. The operator may for example achieve cornering with a 12.2 meter (forty ft.) bending radius, or may make two cuts intersecting at ninety degrees, for example, to form a corner.

The various embodiments disclosed may be used with dirt roads or a soil surface as the technology is not necessarily limited to use on asphalt or other hard road surfaces.

After construction is completed and in the event that future road repairs or the like are needed, the applicable surface may be worked, planed, milled and/or removed without damage to the integrity of the cable(s) 14 and normally without damage to the integrity of the rigidified composition 16.

What is claimed is:

1. A method for constructing an underground cable line in-situ through an existing covering surface disposed over a subsurface below the existing covering surface, the existing covering surface comprising a first material selected from a group consisting of pavement, paving, concrete, asphalt, blacktop, cobblestone and brick, and the subsurface comprising a second material different from the first material, the method comprising:
   A) cutting the existing covering surface to create a void through the existing covering surface and into the second material of the subsurface below the existing covering surface and thereby creating a volume of debris, wherein the void has a depth greater than the existing covering surface and a width between 1.27 cm and 3.8 cm;
   B) evacuating the volume of debris from at least the void;
   C) laying a cable into the void;
   D) flowing a non-shrinking composition into a portion of the void so as to encase the cable; and
   E) after hardening of the non-shrinking composition, applying a topping material to a remaining portion of the void.

2. The method of claim 1, wherein evacuating the volume of debris from at least the void comprises:
   vacuuming the volume of debris concurrently with cutting the existing covering surface to create the void through the existing covering surface and into the second material of the subsurface below the existing covering surface.

3. The method of claim 2, wherein vacuuming the volume of debris concurrently with cutting the existing covering surface to create the void through the existing covering surface and into the second material of the subsurface below the existing covering surface comprises:
   cooling a cutting blade used in cutting the existing covering surface to create the void through the existing covering surface and into the second material of the subsurface below the existing covering surface and;
   capturing a stream of loose debris created by the cutting blade.

4. The method of claim 1, wherein flowing a non-shrinking composition into a portion of the void so as to encase the cable comprises:
   pumping said non-shrinking composition into the void.

5. The method of claim 1, wherein flowing a non-shrinking composition into a portion of the void so as to encase the cable comprises:
   pouring said non-shrinking composition into the void.

6. The method of claim 1, wherein after hardening of the non-shrinking composition, applying a topping material to a remaining portion of the void comprises:
   allowing a period of time not to exceed twelve hours to pass for setting and rigidifying of said non-shrinking composition prior to applying the topping material.

7. The method of claim 1, wherein said non-shrinking composition is substantially impermeable upon drying.

8. The method of claim 7, wherein a hydraulic impermeability of the non-shrinking composition is less than 0.0000001 cm/s upon drying.

9. The method of claim 1, wherein the act of cutting the existing covering surface to create a void through the existing covering surface is carried out continuously in one and only one swath from a starting point A to a finishing point B, and wherein the length of the swath is at least 45.72 meters.

10. The method of claim 1, wherein the act of cutting the existing covering surface to create a void through the existing covering surface comprises cutting the existing covering surface such that the void has a width of approximately 1.5 inches.

11. The method of claim 1, wherein the non-shrinking composition is configured to shrink less than one percent upon drying at ambient temperatures.

12. The method of claim 1, wherein the non-shrinking composition is configured to begin to rigidify within one hour of being flowed into the portion of the void.

13. The method of claim 1, wherein the non-shrinking composition is flowable.

14. The method of claim 13, wherein the non-shrinking composition is configured to be viscid and have a viscosity that facilitates flowing.

15. The method of claim 1, wherein the non-shrinking composition is selected from a group consisting of a grout and a mortar substance.

16. The method of claim 1, wherein the non-shrinking composition is configured to be non-compressible.

17. The method of claim 1, wherein the non-shrinking composition is configured to be non-expanding.

18. The method of claim 1, wherein the topping material is configured to adhere to the non-shrinking composition.

19. The method of claim 1, wherein applying a topping material to a remaining portion of the void comprises:
   heating the topping material to 177 degrees centigrade before applying the topping material.

20. The method of claim 1, wherein the topping material is selected from a group consisting of blacktop, asphalt, and bitumen.

21. The method of claim 1, wherein the topping material includes a mastic material.

22. A method for filling a void in an existing covering surface disposed over a subsurface below the existing covering surface, the existing covering surface comprising a first material selected from a group consisting of pavement, paving, concrete, asphalt, blacktop, cobblestone and brick, and the subsurface comprising a second material different from the first material, the method comprising:
   A) flowing a non-shrinking composition into at least a bottom portion of the void; and B) applying a topping material to a remaining top portion of the void so as to cover and seal the non-shrinking composition and the void, wherein:

the non-shrinking composition undergoes rigidification or solidification and is substantially impermeable upon drying;

the topping material is configured to adhere to the non-shrinking composition;

the void has a depth greater than the existing covering surface and extends into the second material of the subsurface; and the void has a width between 1.27 cm and 3.8 cm.

23. The method of claim 22, wherein the non-shrinking composition includes a non-shrinking grout.

24. The method of claim 22, wherein the non-shrinking composition is configured to shrink less than one percent upon drying at ambient temperatures.

25. The method of claim 22, wherein the non-shrinking composition is configured to begin to rigidify within one hour of being flowed into the portion of the void.

26. The method of claim 22, wherein the non-shrinking composition is configured to be substantially impermeable to groundwater.

27. The method of claim 26, wherein the non-shrinking composition has a hydraulic permeability of less than 0.0000001 cm/s upon drying.

28. The method of claim 22, wherein the non-shrinking composition is configured to be viscid and have a viscosity that facilitates flowing.

29. The method of claim 22, wherein the non-shrinking composition is selected from a group consisting of a grout and a mortar substance.

30. The method of claim 22, wherein the non-shrinking composition is configured to be non-compressible.

31. The method of claim 22, wherein the non-shrinking composition is configured to be non-expanding.

32. The method of claim 22, wherein the act of applying a topping material to a remaining top portion of the void comprises:

heating the topping material to 177 degrees centigrade before applying the topping material.

33. The method of claim 22, wherein the topping material is selected from a group consisting of blacktop, asphalt, and bitumen.

34. The method of claim 22, wherein the topping material includes a mastic material.

35. The method of claim 22, wherein applying a topping material to a remaining top portion of the void so as to cover and seal the non-shrinking composition and the void is performed after hardening of the non-shrinking composition.

36. The method of claim 22, wherein the void has a width of approximately 1.5 inches.

37. A method for constructing an underground cable line in-situ through an existing covering surface, the method comprising:

A) cutting the existing covering surface to create a void through the existing covering surface and thereby creating a volume of debris, wherein the void has a width between 1.27 cm and 3.8 cm;

B) evacuating the volume of debris from at least the void;

C) laying a cable into the void;

D) flowing a non-shrinking composition into a portion of the void so as to encase the cable; and E) after hardening of the non-shrinking composition, applying a topping material to a remaining portion of the void, wherein the act of cutting the existing covering surface to create a void through the existing covering surface comprises cutting the existing covering surface such that the void has a depth of approximately 12 inches.

38. A method for constructing an underground cable line in-situ through an existing covering surface, the method comprising:

A) cutting the existing covering surface to create a void through the existing covering surface and thereby creating a volume of debris;

B) evacuating the volume of debris from at least the void;

C) laying a cable into the void;

D) flowing a non-shrinking composition into a portion of the void so as to encase the cable; and E) after hardening of the non-shrinking composition, applying a topping material to a remaining portion of the void, wherein the act of cutting the existing covering surface to create a void through the existing covering surface comprises cutting the existing cutting surface such that the void has a depth of approximately 12 inches and a width of between approximately 0.5 inches and approximately 1.25 inches.

39. A method for filling a void in an existing covering surface, the method comprising:

A) flowing a non-shrinking composition into at least a bottom portion of the void; and B) applying a topping material to a remaining top portion of the void so as to cover and seal the non-shrinking composition and the void, wherein:

the non-shrinking composition undergoes rigidification or solidification and is substantially impermeable upon drying;

the topping material is configured to adhere to the non-shrinking composition; and the void has a width between 1.27 cm and 3.8 cm, and a depth of approximately 12 inches.

40. A method for filling a void in an existing covering surface, the method comprising:

A) flowing a non-shrinking composition into at least a bottom portion of the void; and B) applying a topping material to a remaining top portion of the void so as to cover and seal the non-shrinking composition and the void, wherein:

the non-shrinking composition undergoes rigidification or solidification and is substantially impermeable upon drying;

the topping material is configured to adhere to the non-shrinking composition; and the void has a depth of approximately 12 inches and a width of between approximately 0.5 inches and approximately 1.25 inches.

* * * * *